3,257,347
EPOXY RESIN COMPOSITIONS AND METHODS
OF PREPARING SAME
William G. Woods, Burwood, Victoria, Australia, and William David English, Orange, and Irving S. Bengelsdorf, Santa Ana, Calif., assignors to United States Borax & Chemical Corporation, Los Angeles, Calif., a corporation of Nevada
No Drawing. Filed June 19, 1963, Ser. No. 288,893
15 Claims. (Cl. 260—29.2)

This application is a continuation-in-part of our copending application Serial No. 154,068 filed November 21, 1961.

The present invention relates to epoxy resin compositions and has further reference to a method of preparing the same.

It is, therefore, an object of this invention to provide, as new compositions, reactive epoxy resins containing aminoalkyl glycol monoborate esters as curing agents.

It is also an object of this invention to provide novel solid polyepoxide resins which are soluble in water.

It is a further object of this invention to provide methods of preparing solid polyepoxide resins.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however of but a few of the various ways in which the principle of the invention may be employed.

According to the present invention there are provided reactive epoxy resin compositions containing from about 2% to about 100%, based on the weight of the epoxy resin, of an aminoalkyl glycol monoborate ester having the formula

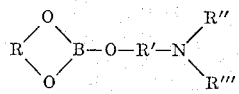

where R is an alkylene radical of from 2 to 4 carbon atoms in length and containing a total of from 2 to about 20 carbon atoms, R' is an alkylene radical of from 2 to 3 carbon atoms in length and containing a total of from 2 to 4 carbon atoms, and R'' and R''' are selected from the group consisting of hydrogen and the alkyl radicals of from 1 to about 18 carbon atoms.

The epoxy resin compositions containing the aminoalkyl glycol monoborate esters can be cured to form hard, solid polyepoxide resins. When the higher concentrations of borate curing agent are used, such as about 30% to 100%, the solid polyepoxide has the additional property of being water soluble, thus making it useful for many applications in which it is desirable to dissolve away the resin after use.

Examples of aminoalkyl glycol monoborate esters useful in this invention include:

2-(β-dimethylaminoisopropoxy)-4,5-dimethyl-1,3-dioxa-2-borolane
2-(β-diisopropylaminoethoxy)-1,3-dioxa-2-borolane
2-(β-dimethylaminoethoxy)-4-methyl-1,3-dioxa-2-borinane
2-(β-di-n-butylaminoethoxy)-4-methyl-1,3-dioxa-2-borinane
2-(β-dimethylaminoethoxy)-4,4,6-trimethyl-1,3-dioxa-2-borinane
2-(β-di-n-butylaminoethoxy)-4,4,6-trimethyl-1,3,-dioxa-2-borinane
N-ethyl-2-aminoethyl-2,4-dimethyl-1,3-dioxa-2-borinane
2(β-diethylaminoethoxy)4,4,6-trimethyl-1,3-dioxa-2-borinane
2-(β-diethylaminoethoxy)-1,3-dioxa-2-borinane
2-(γ-aminopropoxy)-4-methyl-1,3-dioxa-2-borinane The method for preparing the aminoalkyl monoborate esters can best be illustrated by the following equations:

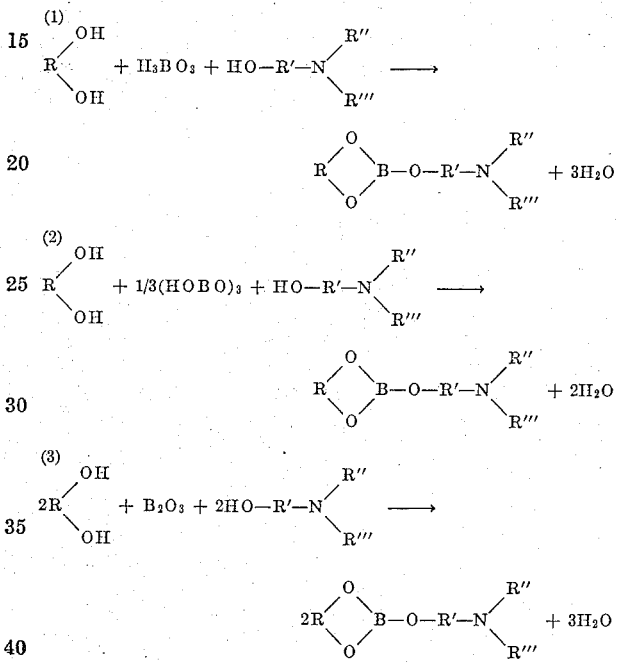

where R, R', R'' and R''' have the significance previously assigned. The reaction will proceed when there is an excess of reactants. Such excess, however, tends to interfere with separating the desired product from the reaction mass, and for the sake of economy and ease of separation, in the preferred embodiment of the invention, we use stoichiometric amounts of the reactants.

The preferred method for performing the above reactions is a direct single-step process which involves admixing an aminoalkanol, a glycol and orthoboric acid, metaboric acid, or boron oxide in the presence of a hydrocarbon solvent which will form an azeotrope with the water of reaction. The admixture is then heated under reflux for several hours to complete the reaction, and the water-hydrocarbon solvent azeotrope is removed by distillation. Any excess solvent present is then removed from the remaining reaction mass by distillation and the desired aminoalkyl glycol monoborate ester is recovered as the residue.

We have found that the removal of the water of reaction is greatly facilitated when an excess of the azeotroping agent is present, and in the preferred embodiment of the invention we use from about 1 to 5 or more volumes of hydrocarbon solvent per volume of reactants present. Such common solvents as benzene, n-heptane, toluene, aliphatic naphtha and xylene are illustrative of a few of the hydrocarbon solvents applicable as azeotroping agents to the present process.

The aminoalkanols applicable to the reaction have the formula

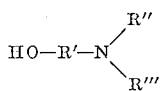

where R′ is an alkylene radical of from 2 to 3 carbons in length and containing a total of from 2 to 4 carbon atoms, and R″ and R‴ can be either hydrogen or alkyl radicals of from 1 to about 18 carbon atoms. The aminoalkanols, therefore, can be either primary aminoalkanols where R′ is the defined alkylene radical and R″ and R‴ are both hydrogen, or secondary aminoalkanols where R′ is the defined alkylene radical and either R″ or R‴ is hydrogen while the other is an alkyl radical, or tertiary aminoalkanols where R′ is the defined alkylene radical and R″ and R‴ are both alkyl radicals.

The glycols applicable to the reaction are diols containing from 2 to about 20 carbon atoms in which 2 to 4 carbon atoms separate the two hydroxyl groups. They are well known to the art and readily available.

The presently preferred borate esters can be represented by the formula

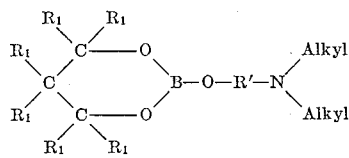

where $R_1$ is selected from the group consisting of hydrogen and alkyl of 1 to 5 carbon atoms, R′ is an alkylene radical of from 2 to 3 carbon atoms in length and containing a total of from 2 to 4 carbon atoms, and Alkyl is lower alkyl of from 1 to about 5 carbon atoms.

The following examples are presented to illustrate the preparation of representative borate esters useful in this invention but it is to be understood that the invention is not to be limited to the specific examples given.

(I)

A mixture of 103.2 grams (1.00 mole) of N,N-dimethyl-1-amino-2-propanol, 61.84 grams (1.00 mole) of boric acid and 90.12 grams (1.00 mole) of 2,3-butanediol was placed in a 2 liter round-bottomed flask containing 400 ml. of benzene. The flask was equipped with a reflux condenser, a Dean-Stark trap and a magnetic stirrer, and was heated for about 8 to 10 hours under reflux, at which time the theoretical amount of water, 54 ml., had been removed. The excess benzene was then removed by distillation and 149.4 grams (74.3% yield) of 2-(β-dimethylaminoisopropoxy)-4,5-dimethyl-1,3-dioxa-2-borolane were recovered, B.P. 131–132° C./8.5–33 mm.; $n_D$ (24.5° C.)=1.452. Analysis of the product yielded the following data:

Calculated for $C_9H_{20}BNO_3$: B=5.38%; N=6.97%. Found in product: B=5.69%; N=6.98%.

(II)

A mixture of 145.2 grams (1.00 mole) of N,N-diisopropyl-2-aminoethanol, 61.84 grams (1.00 mole) of boric acid and 62.1 grams (1.00 mole) of 1,2-ethanediol was placed in a 2 liter round-bottomed flask containing 500 ml. of benzene. The flask was equipped with a reflux condenser, a Dean-Stark trap and a magnetic stirrer, and was heated for about 12 hours under reflux, at which time the theoretical amount of water, 54 ml., had been removed. The excess benzene was then removed by distillation and 158.2 grams (73.5% yield) of 2-(β-diisopropylaminoethoxy)-1,3-dioxa-2-borolane were recovered, B.P. 123° C./4.1–3.5 mm.; $n_D$ (21° C.)=1.467. Analysis of the product yielded the following data:

Calculated for $C_{10}H_{22}BNO_2$: B=5.03%; N=6.51%. Found in product: B=5.04%; N=6.42%.

(III)

A mixture of 178 grams (2.0 moles) of N,N-dimethyl-2-aminoethanol, 70 grams (1.0 mole) of boron trioxide and 180 grams (2.0 moles) of 1,3-butanediol was placed in a 2 liter round-bottomed flask containing 500 ml. of benzene. The flask was equipped with a reflux condenser, a Dean-Stark trap and a magnetic stirrer, and was heated for 6 hours under reflux, at which time the theoretical amount of water, 54 ml., had been removed. The excess benzene was then removed by distillation and 245.9 grams (65.7% yield) of 2-(β-dimethylaminoethoxy)-4-methyl-1,3-dioxa-2-borinane were recovered, B.P. 93° C./7–2.5 mm.; $n_D$ (23.5° C.)=1.438. Analysis of the product yielded the following data:

Calculated for $C_8H_{18}BNO_3$: B=5.79%; N=7.49%. Found in product: B=5.78%; N=7.63%.

(IV)

A mixture of 173.3 grams (1.00 mole) of N,N-dibutyl-2-aminoethanol, 61.84 grams (1.00 mole) of boric acid and 90.1 grams (1.00 mole) of 1,3-butanediol was placed in a 2 liter round-bottomed flask containing 500 ml. of aliphatic naphtha. The flask was equipped with a reflux condenser, a Dean-Stark trap and a magnetic stirrer, and was heated for about 2 hours under reflux, at which time the theoretical amount of water, 54 ml., had been removed. The excess aliphatic naphtha was then removed by distillation and 249.5 grams (92.0% yield) of 2-(β-di-n-butylaminoethoxy)-4-methyl-1,3-dioxa-2-borinane were recovered, B.P. 105–110° C./0.40–0.55 mm.; $n_D$ (21° C.)=1.446. Analysis of the product yielded the following data:

Calculated for $C_{14}H_{30}BNO_3$: B=3.99%; N=5.16%; C=62.00%; H=11.15%. Found in product: B=4.05%; N=5.09%; C=62.51%; H=11.19%.

(V)

A mixture of 98 grams (1.10 mole) of N,N-dimethyl-2-aminoethanol, 61.84 grams (1.00 mole) of boric acid and 118.2 grams (1.00 mole) of 2-methyl-2,4-pentanediol was placed in a 2 liter round-bottom flask containing 400 ml. of benzene. The flask was equipped with a reflux condenser, a Dean-Stark trap and a magnetic stirrer, and was heated for about 7 hours under reflux, at which time the theoretical amount of water, 54 ml., had been removed. The excess benzene was then removed by distillation and 174.2 grams (81.0% yield) of 2-(β-dimethylaminoethoxy)-4,4,6-trimethyl-1,3-dioxa-2-borinane were recovered, B.P. 53° C./0.10–0.13 mm.; $n_D$ (23° C.)=1.434. Analysis of the product yielded the following data:

Calculated for $C_{10}H_{22}BNO_3$: B=5.03%; N=6.51%. Found in product: B=5.03%; N=6.54%.

(VI)

A mixture of 86.65 grams (0.50 mole) of N,N-dibutyl-2-aminoethanol, 30.92 grams (0.50 mole) of boric acid and 59.09 grams (0.50 mole) of 2-methyl-2,4-pentanediol was placed in a 2 liter round-bottomed flask containing 450 ml. of toluene. The flask was equipped with a reflux condenser, a Dean-Stark trap and a magnetic stirrer, and was heated for about 4 hours under reflux, at which time the theoretical amount of water, 27 ml., had been removed. The excess toluene was then removed by distillation and 145.8 grams (97.5% yield) of 2-(β-di-n-butylaminoethoxy)-4,4,6-trimethyl-1,3-dioxa-2-borinane were recovered as the residue. Analysis of the product yielded the following data:

Calculated for $C_{16}H_{34}BNO_3$: B=3.62%; N=4.68%. Found in product: B=3.61%; N=4.69%.

(VII)

A mixture of 117.2 grams (1.00 mole) of N,N-diethyl-2-aminoethanol, 118.1 grams (1.00 mole) of hexylene glycol and 61.8 grams (1.00 mole) of boric acid was placed in a 2 liter round-bottomed flask containing 400 ml. of toluene. The flask was equipped with a packed distillation column fitted with a reflux condenser and a Dean-Stark trap. The mixture was stirred (magnetically) and heated under reflux for 10.25 hours, at which time 54.0 ml. (100%) of the theoretical quantity of water had collected in the trap. The excess toluene was removed by distillation and 222 grams (91.3%) of 2-($\beta$-diethylaminoethoxy) - 4,4,6 - trimethyl - 1,3 - dioxa - 2-borinane were recovered, B.P. 147–149.5° C./20 mm.; $n_D$ (25.3° C.)=1.436. Analysis of the product yielded the following data:

Calculated for $C_{12}H_{26}BNO_3$: B=4.46%; N=5.73%
Found in product: B=4.83%; N=5.76%.

(VIII)

A mixture of 117.2 grams (1.0 mole) of N,N-diethyl-2-aminoethanol, 61.84 grams (1.0 mole) of boric acid and 90.12 grams (1.0 mole) of 1,4-butanediol was placed in a 2 liter round-bottomed flask containing 500 ml. of toluene. The flask was equipped with a reflux condenser, a Dean-Stark trap and a magnetic stirrer, and was heated for about 6 hours under reflux, at which time the theoretical amount of water, 54 ml., had been removed. The excess toluene was then removed by distillation and 189.0 grams, (88.0% yield) of 2-($\beta$-diethylaminoethoxy)-1,3-dioxa-2-borepane were recovered as the residue. Analysis of the product yielded the following data:

Calculated for $C_{10}H_{22}BNO_3$: B=5.03%; N=6.51%.
Found in product: B=4.79%; N=6.41%.

(IX)

A mixture of 150.2 grams (2.0 moles) of 3-aminopropanol, 69.64 grams (1.0 mole) of boron trioxide and 180.2 grams (2.0 moles) of 1,3-butanediol was placed in a 2 liter round-bottomed flask containing 300 ml. of benzene. The flask was equipped with a reflux condenser, a Dean-Stark trap and a magnetic stirrer, and was heated under reflux for 12 to 14 hours, at which time 97% of the theoretical amount of water, 52.5 ml., had been removed. The excess benzene was then removed by distillation and 342 grams (99.0% yield) of 2-($\gamma$-aminopropoxy)-4-methyl-1,3-dioxa-2-borinane were recovered as the residue. Analysis of the product yielded the following data:

Calculated for $C_7H_{16}BNO_3$: B=6.25%; N=8.10%.
Found in product: B=6.16%; N=8.06%.

(X)

A mixture of 58.6 grams (0.50 mole) of N-t-butyl-2-aminoethanol, 30.92 grams (0.50 mole) of boric acid and 38.05 grams (0.50 mole) of 1,3-propanediol was placed in a 1 liter flack containing 250 ml. of isooctane. The flask was equipped with a reflux condenser, a Dean-Stark trap and a magnetic stirrer and was heated for about 5.5 hours under reflux, at which time the theoretical amount of water, 27 ml., had been removed. The excess isooctane was then removed by distillation and 95 grams (94.5% yield) of 2-($\beta$-t-butylaminoethoxy)-1,3-dioxa-2-borinane were recovered as the residue. Analysis of the product yielded the following data:

Calculated for $C_9H_{20}BNO_3$: B=5.38%; N=6.97%.
Found in product: B=5.17%; N=7.24%.

(XI)

A mixture of 75.1 grams (1.0 mole) of 1-amino-2-propanol, 61.84 grams (1.0 mole) of boric acid and 118.2 grams (1.0 mole) of 2-methyl-2,4-pentanediol was placed in a 2 liter round-bottomed flask containing 400 ml. of toluene. The flask was equipped with a reflux condenser, a Dean-Stark trap and a magnetic stirrer, and was heated for about 16 hours under reflux, at which time the theoretical amount of water, 54 ml., had been removed. The excess toluene was then removed by distillation and 193.0 grams (96% yield) of 2-($\beta$-aminoisopropoxy)-4,4,6-trimethyl-1,3-dioxa-2-borinane were recovered as the residue. Analysis of the product yielded the following data:

Calculated for $C_9H_{20}BNO_3$: B=5.38%; N=6.97%.
Found in product: B=5.21%; N=7.31%.

(XII)

A mixture of 75.1 grams (1 mole) of N-methyl-2-aminoethanol, 34.82 grams (0.50 mole) of boron trioxide and 118.2 grams (1.0 mole) of 2-methyl-2,4-pentanediol was placed in a 2 liter round-bottomed flask containing 400 ml. of xylene. The flask was equipped with a reflux condenser, a Dean-Stark trap and a magnetic stirrer, and was heated for about 8 hours under reflux, at which time the theoretical amount of water, 27 ml., had been removed. The excess xylene was then removed by distillation and 187.0 grams (93% yield) of 2-($\beta$-methylaminoethoxy) - 4,4,6-trimethyl-1,3-dioxa-2-borinane were recovered as the residue. Analysis of the product yielded the following data:

Calculated for $C_9H_{20}BNO_3$: B=5.38%; N=6.97%.
Found in product: B=5.13%; N=7.29%.

(XIII)

A mixture of 100 grams (1.12 moles) of N-ethyl-2-aminoethanol, 49 grams (1.11 moles) of metaboric acid and 115 grams (1.11 moles) of 2,4-pentanediol was placed in a 2 liter round-bottom flask containing 400 ml. of heptane. The flask was fitted with a reflux condenser connected to a Dean-Stark trap and a magnetic stirrer. The reaction mass was heated under reflux for about 6 hours, at which time 40 ml. (theoretical amount) of water was collected in the trap. The excess heptane was removed by distillation and 208 grams (93%) of N-ethyl-2-aminoethyl-2,4-dimethyl-1,3-dioxa-2-borinane were recovered as the residue. Analysis of the product yielded the following data:

Calculated for $C_9H_{20}BNO_3$: B=5.38%; N=6.96%.
Found in product: B=5.42%; N=6.89%.

As noted previously, the compounds of the present invention are excellent curing agents for epoxy resins. We have found that from about 2% to about 100%, and preferably about 4% to about 50%, based on the weight of the epoxy resin, of a borate compound of the present invention will induce curing and result in a superior cured epoxy resin composition.

The present borate ester compounds can be used as curing agents for any of the known reactive polyepoxides. These epoxy resins or reactive polyepoxides are compounds or mixtures of compounds, the average molecule of which contains more than one 1,2-epoxy group,

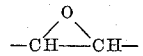

arranged in either one or more open chain, aromatic or cyclic structures. Owing to the methods for preparing the reactive polyepoxides, and the fact that they are sometimes a mixture of chemical compounds having different structures and containing some groups which are not converted to 1,2-epoxy groups, the number of epoxy groups in an average molecule of the product is not necessarily a whole number. However, in all instances the average number of epoxy groups must be greater than one.

There are four major classes of reactive polyepoxide resins:

(1) Glycidyl ethers—derived from dihydric phenols such as the condensation product of bisphenol A and epichlorohydrin or derived from polyhydric phenols such as phenolformaldehyde condensation products, or derived from polyols such as glycols and glycerol;

(2) Epoxidized unsaturated glycerides and abietic acid derivatives—such as epoxidized soybean oil, linseed oil and tall oil;

(3) Epoxidized polyolefins—such as epoxidized polybutadiene and polyisoprene; and (4) Epoxidized cyclopolyolefins—such as epoxidized dicyclopentadiene, vinylcyclohexene and other Diels-Alder reaction products.

It is to be clearly understood that the borate ester compounds of the present invention are applicable as curing agents for any of the reactive polyepoxide resins of the foregoing defined classes.

It is sometimes desirable to add other materials to the resin composition in order to impart certain desired characteristics. It will be found that such additives do not interfere with the action of the present compounds as curing agents. Reinforcing materials such as glass, mineral or metal fibers add strength and decrease shrinkage when the composition is cured; inert granular materials such as mica, asbestos or iron oxide lower the overall cost of the finished product; thixotropic agents, such as bentonite and silica, thicken liquid epoxy compositions so they can be applied to a vertical surface and cured in place; and coloring agents such as titanium dioxide, cadmium pigments and organic dyestuffs overcome the amber color usually associated with cured epoxy resin compositions. These and other similar materials known to the art can be used in combination with the present compounds to produce cured epoxy resin compositions.

The following examples are illustrative of the use of the present compounds as curing agents for epoxy resin compositions.

(XIV)

2-($\beta$-diethylaminoethoxy)-4,4,6-trimethyl - 1,3 - dioxa-2-borinane, chlorinated biphenyl, antimony oxide and an aromatic glycidyl ether epoxy resin (condensation product of bisphenol A and epichlorohydrin) were thoroughly mixed in an amout equivalent to 10 parts of the borinane, 10 parts of the biphenyl and 5 parts of the antimony oxide per 100 parts of the epoxy resin by weight. The composition was cured at 125° C. for 2 hours. The resultant cured product was a hard, self-extinguishing, flame-retardant resin which had a heat distortion temperature of 82° C.

The same composition when cured at 120° C. for 18 hours had a heat distortion temperature of 111° C. and a Shore D hardness of 90.

(XV)

2-($\beta$-dimethylaminoethoxy)-4-methyl - 1,3 - dioxa - 2-borinane and an aromatic glycidyl ether epoxy resin (condensation product of bisphenol A and epichlorohydrin) were thoroughly mixed in an amount equivalent to 10 parts of the borinane per 100 parts of the epoxy resin by weight. The composition was cured at 120° C. for 15¾ hours and the resultant product was a clear, strong, hard, flame-resistant casting which had a heat distortion temperature of 139° C. and a Shore D hardness of 92.

(XVI)

2-($\beta$-dimethylaminoethoxy)-4-methyl - 1,3 - dioxa - 2-borinane and an epoxy novolac resin (condensation product of a novolac resin and epichlorohydrin) were thorougly mixed in an amount equivalent to 10 parts of the borinane per 100 parts of the epoxy resin by weight. The composition was cured for 15½ hours at 120° C. The resultant casting had extremely good impact resistance, a heat distortion temperature of 145° C. and a Shore D hardness of 94.

When the higher concentrations of the borate ester are used as a curing agent, the resulting solid polyepoxide is hard and tough, but it has the surprising property of being water-soluble. Thus, when from about 30% to 100% of the borate ester, based on the weight of the epoxy resin, is used, the resulting solid polyepoxide is slowly soluble in water at room temperature and dissolves rapidly in hot water. The dissolving time will depend on many factors such as the temperature of the water, amount of water, stirring of the system, and the amount of borate ester used, but generally the resins will dissolve completely in about 10 volumes of water at 25° C. in less than 100 hours in a static (no stirring) system.

The chemical structure of the water-soluble solid polyepoxides is not presently known, but most, if not all of the borate, appears to be chemically combined with the epoxy resin. The unique water-solubility of the solid polyepoxides can be advantageously used in many applications such as filament winding or molding where a core can be dissolved out later.

The following examples illustrate the preparation of water-soluble polyepoxide resins.

(XVII)

2-($\beta$-dimethylaminoethoxy)-4-methyl - 1,3 - dioxa - 2-borinane and CIBA 6020 epoxy resin (condensation product of bisphenol A with epichlorohydrin) were thoroughly mixed in a mold in amounts equivalent to 30 parts of the borinane per 100 parts of the epoxy resin by weight. After curing at 120° C. for 16 hours, the resultant resin was a strong, hard casting which had a Barcol hardness of 49.

The 40 gram casting was suspended in 400 ml. of water at 25° C. and dissolved completely in 62 hours. The system was static, that is, the water was not stirred while dissolving the casting.

(XVIII)

The procedure of Example XVII was repeated except the casting was suspended in 400 ml. of water at 100° C. The casting dissolved completely in 2 hours.

(XIX)

The procedure of Example XVII was repeated except 60 parts of the borinane per 100 parts of the epoxy resin were used. The resultant casting had a Barcol hardness of 34 and dissolved completely in water at 25° C. in 5 hours.

(XX)

The procedure of Example XVII was repeated except 80 parts of the borinane per 100 parts of the epoxy resin were used and the composition was cured for 16 hours at 65° C. The resultant casting had a Barcol hardness of 43 and dissolved completely in 25° C. water in about 3 hours.

(XXI)

2-($\beta$-dimethylaminoethoxy)-4-methyl - 1,3 - dioxa - 2-borinane and CIBA 6010 epoxy resin (condensation product of bisphenol A with epichlorohydrin) were thoroughly mixed in a mold in amounts equivalent to 60 parts of the borinane per 100 parts of the epoxy resin by weight. After curing for 16 hours at 65° C. the resultant hard resin (40 grams) was suspended in 400 ml. of water (static system) at 25° C. The resin had totally dissolved after 5 hours.

(XXII)

The procedure of Example XXI was repeated except that 100 parts of the borinane per 100 parts of the resin were used and the composition was cured at 120° C. for 16 hours. The casting dissolved completely in 4 hours in water at 25° C.

(XXIII)

The procedure of Example XXI was followed using DER 332 epoxy resin (an epichlorohydrin-bisphenol A condensation product) and 40 parts of the borinane per 100 parts of the epoxy resin. The resulting casting had a Barcol hardness of 40 and dissolved completely in 30 hours in water at 25° C.

(XXIV)

The procedure of Example XXI was followed except DEN 438 epoxy resin (an epoxidized Novolac resin) was used with 50 parts of borinane per 100 parts of the epoxy resin and the composition was cured for 16 hours at room temperature and then 6 hours at 100° C. The hard casting dissolved completely in 10 hours in water at 25° C.

Other modes of applying the principle of the invention may be employed, change being made as regards the details described, provided the features stated in any of the following claims or the equivalent of such be employed.

We, therefore, particularly point out and distinctly claim as our invention:

1. A hard, solid, poly-1,2-epoxide resin chemically combined with an aminoalkyl glycol monoborate of the formula

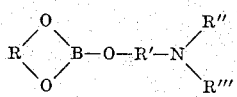

where R is an alkylene radical of from 2 to 4 carbon atoms in length and containing a total of from 2 to about 20 carbon atoms, R' is an alkylene radical of 2–3 carbon atoms in length and containing a total of 2–4 carbon atoms, and R" and R'" are selected from the group consisting of hydrogen and the alkyl radicals of from 1 to about 18 carbon atoms, said resin being substantially completely dissolved in about 10 volumes of water at about 25° C. without stirring in less than about 100 hours.

2. An aqueous solution of the composition of claim 1.

3. A composition comprising a reactive 1,2-epoxy resin having more than one 1,2-epoxy group per molecule and from 2% to about 100%, based on the weight of the 1,2-epoxy resin, of an aminoalkyl glycol monoborate ester having the formula

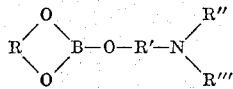

where R is an alkylene radical of from 2 to 4 carbon atoms in length and containing a total of from 2 to about 20 carbon atoms, R' is an alkylene radical of from 2 to 3 carbon atoms in length and containing a total of from 2 to 4 carbon atoms, and R" and R'" are selected from the group consisting of hydrogen and the alkyl radicals of from 1 to about 18 carbon atoms.

4. A composition according to claim 3 in which said aminoalkyl glycol monoborate ester is 2-(β-dimethylaminoethoxy)-4-methyl-1,3-dioxa-2-borinane.

5. A composition comprising a reactive polyepoxide having more than one 1,2-epoxy group per molecule and from about 2% to about 50%, based on the weight of the reactive polyepoxide, of a curing agent of the formula

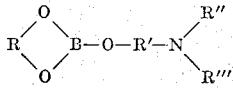

where R is an alkylene radical of from 2 to 4 carbon atoms in length and containing a total of from 2 to about 20 carbon atoms, R' is an alkylene radical of from 2 to 3 carbon atoms in length and containing a total of from 2 to 4 carbon atoms, and R" and R'" are selected from the group consisting of hydrogen and the alkyl radicals of from 1 to about 18 carbon atoms.

6. A composition comprising an aromatic glycidyl ether resin and from about 2% to about 50% based on the weight of said resin, of 2-(β-diethylaminoethoxy)-4,4,6-trimethyl-1,3-dioxa-2-borinane.

7. A composition comprising an aromatic glycidyl ether resin and from about 2% to about 50%, based on the weight of said resin, of 2-(β-dimethylaminoethoxy)-4-methyl-1,3-dioxa-2-borinane.

8. A composition comprising an epoxy novolac resin and from about 2% to about 50%, based on the weight of said resin, of 2-(β-dimethylaminoethoxy)-4-methyl-1,3-dioxa-2-borinane.

9. In the method of preparing a solid polyepoxide resin by reacting a 1,2-epoxy resin with a curing agent, the improvement which comprises the employment as said curing agent of from about 2% to about 100%, based on the weight of said resin, of a borate ester of the formula

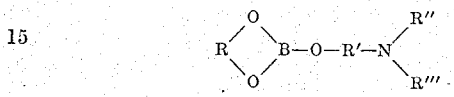

where R is an alkylene radical of from 2 to 4 carbon atoms in length and containing a total of from 2 to about 20 carbon atoms, R' is an alkylene radical of from 2 to 3 carbon atoms in length and containing a total of from 2 to 4 carbon atoms, and R" and R'" are selected from the group consisting of hydrogen and the alkyl radicals of from 1 to about 18 carbon atoms.

10. The method of claim 9 in which about 4% to about 50% of said curing agent is employed.

11. The method of claim 9 in which said borate ester has the formula

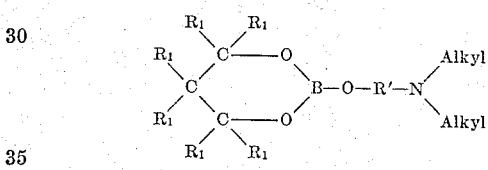

where $R_1$ is selected from the group consisting of hydrogen and alkyl of 1 to 5 carbon atoms, R' is an alkylene radical of from 2 to 3 carbon atoms in length and containing a total of from 2 to 4 carbon atoms, and Alkyl is a lower alkyl group of from 1 to 5 carbon atoms.

12. The method of claim 9 in which said borate ester is 2-(β-dimethylaminoethoxy)-4-methyl-1,3-dioxa-2-borinane.

13. The method of preparing a hard, solid, water-soluble polyepoxide resin which comprises reacting a reactive 1,2-epoxy resin having more than one 1,2-epoxy group per molecule with from about 30% to about 100%, based on the weight of the reactive 1,2-epoxy resin, of a borate ester of the formula

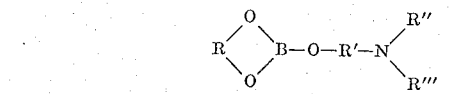

where R is an alkylene radical of from 2 to 4 carbon atoms in length and containing a total of from 2 to about 20 carbon atoms, R' is an alkylene radical of from 2 to 3 carbon atoms in length and containing a total of from 2 to 4 carbon atoms, and R" and R'" are selected from the group consisting of hydrogen and the alkyl radicals of from 1 to about 18 carbon atoms.

14. The method of claim 13 in which said borate ester has the formula

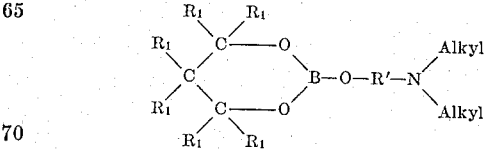

where $R_1$ is selected from the group consisting of hydrogen and alkyl of 1 to 5 carbon atoms, R' is an alkylene radical of from 2 to 3 carbon atoms in length and containing a total of from 2 to 4 carbon atoms, and Alkyl is a lower alkyl group of from 1 to 5 carbon atoms.

15. The method of claim 13 in which said borate ester is 2 - (β - dimethylaminoethoxy)-4-methyl-1,3-dioxa-2-borinane.

References Cited by the Examiner
UNITED STATES PATENTS

| | | | |
|---|---|---|---|
| 1,953,741 | 4/1934 | Bennett | 260—462 |
| 2,872,428 | 2/1959 | Schroeder | 260—29.2 |
| 2,970,130 | 1/1961 | Firestone | 260—47 |

OTHER REFERENCES

Borester Boric Acid Esters, Chemical and Engineering News, vol. 36, July 21, 1958, pp. 112 and 113.

New Curing Agents for Epoxy Resins, SPE Journal, March 1960, pp. 315–318.

MURRAY TILLMAN, *Primary Examiner.*

SAMUEL H. BLECH, *Examiner.*

J. C. BLEUTGE, *Assistant Examiner.*